(12) United States Patent
Suda et al.

(10) Patent No.: US 7,119,041 B2
(45) Date of Patent: Oct. 10, 2006

(54) CERIUM BASED COMPOSITE OXIDE, SINTERED PRODUCT THEREOF AND METHOD FOR PREPARATION THEREOF

(75) Inventors: Eisaku Suda, Tokushima (JP); Bernard Pacaud, Nishinomiya (JP)

(73) Assignee: Anan Kasei Co., Ltd., Kobe (JP)

( * ) Notice: Subject to any disclaimer, the term of this patent is extended or adjusted under 35 U.S.C. 154(b) by 51 days.

(21) Appl. No.: 10/507,032

(22) PCT Filed: Jun. 27, 2002

(86) PCT No.: PCT/JP02/06472

§ 371 (c)(1),
(2), (4) Date: Sep. 7, 2004

(87) PCT Pub. No.: WO03/076336

PCT Pub. Date: Sep. 18, 2003

(65) Prior Publication Data

US 2005/0119108 A1  Jun. 2, 2005

(30) Foreign Application Priority Data

Mar. 8, 2002  (JP)  ............................. 2002-062865

(51) Int. Cl.
*C04B 35/50* (2006.01)

(52) U.S. Cl. .................. 501/152; 423/263; 429/33

(58) Field of Classification Search ............... 501/152; 423/263; 429/33
See application file for complete search history.

(56) References Cited

U.S. PATENT DOCUMENTS 5,665,482 A * 9/1997 Mori et al. .................. 429/33

(Continued)

FOREIGN PATENT DOCUMENTS

| JP | 04-310516 A1 | 11/1992 |
| JP | 08-169713 A1 | 7/1996 |
| JP | 11-273451 | * 10/1999 |

(Continued)

OTHER PUBLICATIONS

Inaba et al, "Sintering Behaviors of ceria and gadolinia-doped ceria", Solid states Ionics, Bd. 106 Nr. 3-4, Feb. 1, 1998 pp. 263-268.*

(Continued)

*Primary Examiner*—Karl Group
(74) *Attorney, Agent, or Firm*—Darby & Darby (57) ABSTRACT

The invention provides a cerium based composite oxide and its production method, which hardly forms aggregates, is composed of particular acicular particles providing sinterable ceramic materials, has a sharp particle size distribution, and inhibited from aggregating. The composite oxide contains 0.1–50 mol % of metal such as Y, Sc, or rare earth elements excluding Ce and Pm, in terms of oxides, and 50 to 99.9 mol % of cerium in terms of oxides, wherein the composite oxide takes the acicular primary particle form having an average aspect ratio of 1.05–10.0, or secondary particle form, aggregates of the primary particles. The composite oxide containing the primary and second particles have a BET specific surface area of 5 to 40 m²/g, an average particle size of 0.1 to 0.5 μm, and a particle size distribution index represented by formula (1) of not higher than 1.6:

Particle Size Distribution Index=$(D84-D16)/(2 \times D50)$. (1)

8 Claims, 4 Drawing Sheets

U.S. PATENT DOCUMENTS

| | | |
|---|---|---|
| 5,945,369 A | 8/1999 | Kimura et al. |
| 6,528,195 B1 * | 3/2003 | Taniguchi .................... 429/33 |
| 6,709,628 B1 * | 3/2004 | Kleinlogel et al. ......... 264/661 |
| 6,770,392 B1 * | 8/2004 | Cutler et al. .................. 429/33 |
| 2003/0124403 A1 * | 7/2003 | Taniguchi .................... 429/33 |
| 2005/0142053 A1 * | 6/2005 | Takamura et al. .......... 423/263 |

FOREIGN PATENT DOCUMENTS

| | | |
|---|---|---|
| JP | 2000-007435 A1 | 1/2000 |
| JP | 2002-029742 A1 | 1/2002 |
| KR | 2004077081 * | 9/2004 |

OTHER PUBLICATIONS

Van Herle et al "Sintering behavior and ionic conductivity of Yttria-doped ceria" J. of Er. Ceramic Soc. Bd. 16, Nr.9 (1996) pp. 961-973.*

Overs et al "Properties of the solidelectrolyte gadolinia-doped ceria prepared by thermal decomposition of mixed cerium-gadolinium oxalate", J. of Am. Cerm. Soc., Dec. 1982.*

Rahaman et al "Effect of solid solution additives on sintering of ultra-fine CeO powder" J. of Er. Ceramic Soc. Jan. 1995.*

* cited by examiner

CERIUM BASED COMPOSITE OXIDE, SINTERED PRODUCT THEREOF AND METHOD FOR PREPARATION THEREOF

FIELD OF ART

The present invention relates to cerium based composite oxides that may be used for ceramic materials functioning as an electrolyte in electrochemical devices such as sensors, solid oxide fuel cells (SOFC), and the like, and to sintered products of the composite oxides, and methods for producing the composite oxides.

BACKGROUND ART

Cerium based composite oxides in the form of fine spherical particles have been in use as ceramic materials utilizing cerium based composite oxides. Such fine spherical particles are conventionally known to be prepared by precipitation or hydrothermal synthesis. An example of the precipitation method reported is a method wherein precipitate of cerium based composite salt is obtained by coprecipitation, separated by filtration, and calcined to obtain a oxide powder material (JP-8-169713-A). An example of the hydrothermal synthesis proposed is a method wherein precipitate of a cerium based composite salt is processed at high temperature under high pressure to synthesize fine spherical particles.

As far as the primary particles are concerned, both the coprecipitation and hydrothermal synthesis mentioned above are capable of providing fine spherical powders. However, the fineness of the powders causes difficulties in washing and filtration in the powder production process, resulting in remarkable aggregation of the oxide powders and a disadvantageously broad particle size distribution. Further, the hydrothermal synthesis involves processing at high temperature under high pressure in a pressure vessel such as an autoclave, so that the industrial productivity is low, and the production cost is high. In addition, when the powders with a broad particle size distribution are directly used as ceramic materials, the powders cause problems in processibility and sinterability, such as cracks in molding or sintering, and insufficient density of sintered products. Thus such powders with a broad particle size distribution requires pre-treatments such as grinding, dispersing, or sieving, before use as ceramic materials, which increases the process steps in the ceramics production and adds to the production cost.

On the other hand, JP-8-169713-A discloses a highly sinterable cerium based composite oxide that provides a sintered product having a relative sintering density of 98.6% at a sintering temperature of 1450° C. However, the raw material powders have a broad particle size distribution and include coarse particles, so that the powders cannot be molded homogeneously and densely. This causes generation of voids in the molded body, which cannot be eliminated during sintering. Thus densely sintered products having a relative sintering density of not lower than 99% have not been obtained.

SUMMARY OF THE INVENTION

It is an object of the present invention to provide a cerium based composite oxide composed of particular acicular particles, which is hard to form particle aggregates, and provides a highly sinterable ceramic material.

It is another object of the present invention to provide a cerium based composite oxide that does not have a broad particle size distribution, that is inhibited from forming particle aggregates, and is excellent in sinterability.

It is yet another object of the present invention to provide a method for preparing the above-mentioned cerium based composite oxide readily and conveniently.

It is still another object of the present invention to provide a sintered product of cerium based composite oxide that has an extremely high relative sintering density.

In order to achieve the above objects, the present inventors have made intensive researches to find out that a cerium based composite oxide having a sharp particle size distribution that has never been achieved conventionally, may be obtained by heat-treating precipitate of a cerium based composite salt without using a pressure vessel such as an autoclave in the production process thereof, and that the cerium based composite oxide having such a sharp particle size distribution can achieve the above objects, to thereby completing the present invention.

According to the present invention, there is provided a cerium based composite oxide comprising:

0.1 to 50 mol % of at least one metal selected from the group consisting of yttrium, scandium, and rare earth elements excluding cerium and promethium, in terms oxides, and 50 to 99.9 mol % of cerium in terms of oxides, wherein said composite oxide is in a form of acicular primary particles having an average aspect ratio (length/width) of 1.05 to 10.0 (referred to as composite oxide (1) hereinbelow).

According to the present invention, there is also provided a cerium based composite oxide in a form of secondary particles consisting of aggregates of the above primary particles of the cerium based composite oxide, and having an average aspect ratio of 5.0 to 40.0 (referred to as composite oxide (2) hereinbelow).

According to the present invention, there is further provided a cerium based composite oxide comprising the above primary particles of the cerium based composite oxide and the above secondary particles of the cerium based composite oxide, and having a BET specific surface area of 5 to 40 $m^2/g$, an average particle size of 0.1 to 0.5 μm, and a particle size distribution expressed by a particle size distribution index represented by the following formula (1) of not higher than 1.6:

$$\text{Particle Size Distribution Index}=(D84-D16)/(2 \times D50) \quad (1)$$

wherein D16, D50, and D84 each stands for an accumulated particle size of top 16%, 50%, and 84% particles from the finest (referred to as composite oxide (1-2) hereinbelow)

According to the present invention, there is also provided a method for preparing composite oxide (1-2) comprising the steps of:

(A) adding alkali to a cerium salt-containing mixed solution containing 0.1 to 50 mol % salt of at least one metal selected from the group consisting of yttrium, scandium, and rare earth elements excluding cerium and promethium and 50 to 99.9 mol % cerium salt to obtain a precipitate slurry of cerium based composite salt, (B) introducing 0.1 to 1.0 mol carbonate ions per 1 mol of rare earth elements in the precipitate slurry, and heat-treating the precipitate slurry under atmospheric pressure at 40 to 100 ° C to prepare precipitate of carbonate ion-containing cerium based composite salt, (C) calcining the precipitate at 600 to 1000 °C to obtain calcined powders, and (D) grinding the calcined powders.

According to the present invention, there is further provided a green compact molded by pressing composite oxide (1–2).

According to the present invention, there is also provided a sintered product of the green compact, having a relative sintering density of not lower than 99%, and an average grain size of the primary grains in the sintered product of 0.8 to 3.0 μm.

According to the present invention, there is further provided a method of producing the above sintered product comprising sintering the green compact at 1150 to 1400° C.

PREFERRED EMBODIMENTS OF THE INVENTION

The present invention will now be explained in detail.

Composite oxide (1) according to the present invention is primary particles containing at least one metal selected from the group consisting of yttrium, scandium, and rare earth elements excluding cerium and promethium (referred to as non-cerium metal (M) hereinbelow) and cerium at a particular ratio, and having a particular acicular shape.

In composite oxide (1) particles of the present invention, the content of non-cerium metal (M) is 0.1 to 50 mol %, preferably 5 to 40 mol %, more preferably 10 to 20 mol % in terms of oxides, whereas the content of cerium is 50 to 99.9 mol %, preferably 60 to 95 mol %, more preferably 80 to 90 mol % in terms of oxides. With less than 50 mol % cerium, the fluorite crystal structure cannot be maintained, whereas with over 99.9 mol % cerium, sufficient amount of vacancy for the oxide ions required for electrical conductivity cannot be formed.

The form of the particles of composite oxide (1) of the present invention is acicular, with the average aspect ratio of the particles being 1.05 to 10.0, preferably 1.05 to 7, more preferably 1.5 to 5.0. If the average aspect ratio is less than 1.05, remarkable aggregation of the particles occurs, whereas if over 10.0, the particle size distribution becomes broad. Here, the "acicular" particles mean to include elliptical particles.

The composite oxide (2) of the present invention is secondary particles consisting of aggregates of the primary particles, composite oxide (1), and having the aspect ratio of 5.0 to 40.0.

As used herein, the aspect ratio may be obtained from a TEM image. For example, the aspect ratio of the primary particles may be determined by measuring the length and width of 10 particles in aggregates observed in a TEM image of ×50000 magnification taken under a transmission electron microscope (manufactured by JEOL LTD., Model 1200EX), and measuring the average aspect ratio. The aspect ratio of the secondary particles may be determined by measuring the aspect ratio of the aggregates.

Composite oxide (1–2) of the present invention contains the above composite oxides (1) and (2). Composite oxide (1–2) has a BET specific surface area of 5 to 40 m²/g, an average particle size of 0.1 to 0.5 μm measured by laser diffraction, and a particle size distribution expressed by a particle size distribution index represented by the formula (1) of not higher than 1.6, preferably 0 to 1.0:

$$\text{Particle Size Distribution Index} = (D84-D16)/(2 \times D50) \quad (1)$$

In formula (1), D16, D50, and D84 each stands for an accumulated particle size of top 16%, 50%, and 84% particles from the finest.

Here, the average particle size means that of the secondary particles, which are aggregates of the primary particles.

If the BET specific surface area of composite oxide (1–2) is less than 5 m²/g, the surface area is too small to activate and promote sintering, and high densification cannot be achieved. If the BET specific surface area is over 40 m²/g, cracking and peeling may occur during molding. Further, if the average particle size of the acicular particles is less than 0.1 μm, the particles aggregate remarkably, leading to cracking and peeling during molding, whereas if the average particle size is over 0.5 μm, elements of the particles may not be dispersed sufficiently upon sintering, and high densification may not be achieved. If the particle size distribution index exceeds 1.6, the powders cannot be packed sufficiently upon molding, and high densification may not be achieved.

The particles of composite oxide (1–2) of the present invention, due to their excellent particle uniformity, has good moldability and may be packed uniformly, so that a densely sintered product may be obtained at lower temperatures. For example, a green compact to be made into a preferred sintered product to be discussed later may be obtained by pressing composite oxide (1–2) of the present invention under a pressure of 20 to 100 MPa. The green compact may preferably complete shrinkage by heating at a heating rate of 5° C./min up to 1300° C.

The sintered product of the present invention is a sintered product of the green compact mentioned above, and has a relative sintering density of not lower than 99%, and an average grain size of the primary grains in the sintered product of 0.8 to 3.0 μm. The relative sintering density may be obtained from the actual density and the calculated density in accordance with the formula (2):

$$\text{Relative sintering density (\%)} = 100 \times [\text{actual density (g/cm}^3\text{)/calculated density (g/cm}^3\text{)}] \quad (2)$$

The actual density may be determined by first measuring, with a micrometer, the length, width, and height of a rectangular parallelepiped sample after sintering, taking the weight of the sample, and calculating in accordance with the formula (3):

$$\text{Actual density (g/cm}^3\text{)} = \text{sample weight (g)}/(\text{length (cm)} \times \text{width (cm)} \times \text{height (cm)}) \quad (3)$$

The calculated density may be determined by first calculating the lattice parameters of the cubic fluorite structure from the XRD pattern of a powdered, sintered product, and calculating in accordance with the formula (4):

$$\text{Calculated density (g/cm}^3\text{)} = \Sigma A/(a \times b \times c \times N) \quad (4)$$

In the formula, ΣA represents the mass of all the atoms in the unit lattice, and a, b, and c each stands for a lattice parameter, and N stands for an Avogadro's constant ($6.022045 \times 10^{23}$ mol$^{-1}$).

Composite oxide (1–2) of the present invention may be prepared by any method as long as the particular acicular particles are obtained, but the method according to the present invention discussed below is preferred.

According to the present method, step (A) is first carried out, wherein alkali is added to a cerium salt-containing mixed solution containing 0.1 to 50 mol % salt of non-cerium metal (M), and 50 to 99.9 mol % cerium salt to obtain a precipitate slurry of cerium based composite oxide.

The total concentration of the cerium salt and the salts of non-cerium metal (M) together in the cerium salt-containing mixed solution used in step (A) is preferably 0.1 to 1.0 mol/L, more preferably 0.3 to 0.7 mol/L. At less than 0.1 mol/L, the resulting particles aggregate, the particle size distribution index exceeds 1.6, the sinterability may be inhibited, and the productivity is lowered, thus not being preferred. On the other hand, at over 1.0 mol/L, the particles grow to form large primary particles, and the sinterability of the resulting particles may be inhibited.

The alkali used in step (A) is not particularly limited as long as it precipitates the cerium based composite salt, and may preferably be one or more alkali selected from the group consisting of ammonia, ammonium carbonate, ammonium hydrogencarbonate, sodium carbonate, and sodium hydrogencarbonate. The alkali may be added usually in the form of an aqueous solution.

The concentration of the aqueous solution of alkali is preferably 0.3 to 2.0 mol/L, more preferably 0.9 to 1.9 mol/L. At a concentration of less than 0.3 mol/L, the resulting particles aggregate to cause the particle size distribution index to exceed 1.6, the sinterability may be inhibited, and the productivity is lowered. On the other hand, at a concentration of over 2.0 mol/L, the particles grow to form large primary particles, and the sinterability of the particles is inhibited.

In the method of the present invention, next, step (B) is performed wherein 0.1 to 1.0 mol, preferably 0.2 to 0.5 mol carbonate ions per 1 mol of the rare earth elements in the precipitate slurry is introduced into the precipitate slurry of cerium based composite salt obtained in step (A), and the precipitate slurry is heat-treated under atmospheric pressure at a particular temperature to prepare precipitate of carbonate ion-containing cerium based composite salt.

In step (B), the slurry containing a particular amount of carbonate ions is heat-treated under atmospheric pressure, so that the size of the resulting particles may be made uniform, the desired acicular particles may be synthesized selectively, and the particle size distribution may be made sharp.

If the content of the carbonate ions is less than 0.1 mol per 1 mol of the rare earth elements in the slurry, the particle size distribution index of the resulting composite oxide particles exceeds 1.6, with a broad particle size distribution, and larger particles disadvantageously inhibit sintering. On the other hand, if the content exceeds 1.0 mol, the resulting composite oxide particles have an aspect ratio of over 10.0, which disadvantageously inhibit sintering.

The carbonate ions may usually be introduced in the form of an alkaline aqueous solution. Such an alkaline aqueous solution containing carbonate ions may be, for example, one or more aqueous solutions selected from the group consisting of aqueous solutions of ammonium carbonate, ammonium hydrogencarbonate, sodium carbonate, and sodium hydrogencarbonate.

In step (B), the carbonate ions are introduced into the slurry, and the slurry is heat-treated under atmospheric pressure at 40 to 100° C., preferably 70 to 90 ° C. under reflux, to thereby prepare precipitate of carbonate ion-containing cerium based composite salt. If the temperature of the heat-treatment is lower than 40° C., the particle size distribution index of the resulting particles exceeds 1.6, with a broad particle size distribution. If the temperature exceeds 100° C., the resulting particles take the form of fine spheres, which inevitably aggregate to make the particle size distribution broad. Further, the duration of the heat treatment is preferably 1 to 10 hours. With less than 1 hour of heat treatment, growth of the acicular particles may not be sufficient. With over 10 hours of heat treatment, the resulting particles take a fine and spherical form, and the particle size distribution becomes broad, thus not being preferred.

The reflux is necessary for keeping the concentration of the slurry constant during the heat treatment to synthesize uniform particles. Incidentally, if this heat treatment is performed in a pressure vessel under pressure, the resulting particles take the form of fine spheres, which inevitably aggregate to make the particle size distribution broad. Thus the heat treatment must be performed under atmospheric pressure.

In the method of the present invention, next, step (C) of calcining the precipitate obtained in step (B) at a particular temperature to obtain calcined powders, and step (D) of grinding the calcined powders, are carried out, to thereby obtain the objective composite oxide (1–2).

In step (C), the calcining of the precipitate obtained in step (B) may be carried out, for example, by subjecting the heat-treated product obtained in step (B) to filtration, and calcining the obtained filter cake in atmosphere at 600 to 1000° C. If the calcining temperature is lower than 600° C., the precipitate of cerium based composite salt is not decomposed completely, resulting in a mixture of oxides and the precipitate of cerium based composite salt. If the calcining temperature is over 1000° C., the calcining results in aggregation of the particles, so that the objective composite oxide (1–2) cannot be obtained. Preferred duration of the calcining is usually 1 to 10 hours.

In step (D), the grinding may be carried out, for example, using a mortar for 5 minutes to 1 hour.

The sintered product according to the present invention may be obtained by sintering the green compact mentioned above at 1150 to 1400° C. The duration of the sintering is usually 1 to 10 hours. If the duration of sintering is too long, growth of the primary grains in the sintered product proceeds, and it becomes difficult to control the average grain size to fall within the desired range. In general, when ceramics are sintered at a high temperature, the density is increased while the grains grow. Ceramics are composed of grains and grain boundaries, so that the growth of the grains means increase in the grain part, and decrease in the grain boundaries. It is conventionally said that decrease in the grain boundaries lowers the mechanical strength of the ceramics. However, in the sintered body of the present invention, such lowering in mechanical strength may sufficiently be controlled.

Since the cerium based composite oxides of the present invention have excellent sinterability, they are quite useful as ceramic material powders and the like functioning as an electrolyte in electric devices.

Further, with the methods of the present invention, such cerium based composite oxides of the present invention as well as sintered products thereof may easily be prepared at a low cost, which is quite advantageous for production in the industrial scale.

EXAMPLES

The present invention will now be explained in more detail with reference to Examples and Comparative Examples, but the present invention is not limited to these.

Example 1

An aqueous solution of cerium nitrate (manufactured by RHODIA ELECTRONICS AND CATALYSIS, containing 2.5 mol/L cerium in terms of cerium oxide) and an aqueous solution of gadolinium nitrate (manufactured by RHODIA ELECTRONICS AND CATALYSIS, containing 2.0 mol/L gadolinium in terms of gadolinium oxide) were mixed at a ratio of $CeO_2:GdO_{1.5}=90:10$ (molar ratio) in terms of oxides, to prepare a mixed solution. This mixed solution $Ce_{0.9}Gd_{0.1}O_{2-\delta}$ (equivalent to 100 g) was diluted with pure water to prepare a 0.3 mol/L starting solution.

Next, 2.0 L of a separately prepared 75 g/L aqueous solution of ammonium hydrogencarbonate was added to the starting solution under stirring at 25° C. to prepare a precipitate slurry of cerium-gadolinium composite salt. To this precipitate slurry, 0.1 L of a 100 g/L aqueous solution of ammonium hydrogencarbonate was added, and heat-treated in a flask equipped with a reflux condenser under atmospheric pressure at 100° C. for 3 hours. Then filtration and washing were repeated 10 times, using 500 mL of pure water per washing. The obtained precipitate was calcined in atmosphere at 700° C. for 5 hours, and ground in an automatic mortar for 15 minutes, to thereby obtain 100 g of $Ce_{0.9}Gd_{0.1}O_{2-\delta}$ powders. The composition of the obtained powders was confirmed using an ICP emission spectrophotometer (SPS-1100EX) manufactured by SEIKO INSTRUMENTS, INC.

A TEM image (with an apparatus manufactured by JEOL LTD., model 1200 EX), the average particle size (with an apparatus manufactured by HORIBA, LTD., LA-920), and the BET specific surface area (with an apparatus manufactured by QUANTACHROME, model NOVA 2000) of the obtained powders were taken. Further, 30 particles out of the particles observed in the TEM image at the magnification of ×100000 were measured for length and width, to determine the average aspect ratio (length/width) of the primary particles, and the average aspect ratio of the secondary particles, which are aggregated particles. The results are shown in Table 1.

Example 2–4

100 g of the objective cerium based composite oxide powders were prepared in the same way as in Example 1, except that the mixed solution was prepared by mixing an aqueous solution of cerium nitrate (containing 2.5 mol/L cerium in terms of cerium oxide), an aqueous solution of gadolinium nitrate (containing 2.0 mol/L gadolinium in terms of gadolinium oxide), and an aqueous solution of samarium nitrate (containing 2.0 mol/L samarium in terms of samarium oxide) (all manufactured by RHODIA ELECTRONICS AND CATALYSIS) at a molar ratio in terms of oxides as shown in Table 1. The obtained powders were subjected to the same measurements as in Example 1. The results are shown in Table 1.

Comparative Example 1

The aqueous solution of cerium nitrate and the aqueous solution of gadolinium nitrate used in Example 1 were mixed at a ratio of $CeO_2:GdO_{1.5}=90:10$ (molar ratio) in terms of oxides, to thereby prepare a starting solution $Ce_{0.9}Gd_{0.1}O_{2-\delta}$ (equivalent of 100 g).

Then 0.6 L of a separately prepared 160 g/L aqueous solution of ammonium carbonate was added to the starting solution and reacted, to obtain precipitate of composite salt. The obtained precipitate was immediately subjected to filtration, dried at 150° C. for 20 hours, and then calcined at 900° C. for 3 hours. The resulting calcined product was ground in an automatic mortar for 15 minutes to obtain $Ce_{0.9}Gd_{0.1}O_{2-\delta}$ powders. The obtained powders were subjected to the same measurements as in Example 1. The results are shown in Table 1.

Comparative Examples 2–4

100 g of cerium based composite oxide powders were prepared in the same way as in Comparative Example 1, except that the starting solution was prepared by mixing an aqueous solution of cerium nitrate (containing 2.5 mol/L cerium in terms of cerium oxide), an aqueous solution of gadolinium nitrate (containing 2.0 mol/L gadolinium in terms of gadolinium oxide), and an aqueous solution of samarium nitrate (containing 2.0 mol/L samarium in terms of samarium oxide) (all manufactured by RHODIA ELECTRONICS AND CATALYSIS) at a molar ratio in terms of oxides as shown in Table 1. The obtained powders were subjected to the same measurements as in Example 1. The results are shown in Table 1.

TABLE 1

|  | Molar ratio in mixed solution | Composition of obtained powders | Average aspect ratio of primary particles | Average particle size (μm) | Particle size distribution index | BET specific surface area (m²/g) | Average aspect ratio of secondary particles |
|---|---|---|---|---|---|---|---|
| Example 1 | $CeO_2:GdO_{1.5}=90:10$ | $Ce_{0.9}Gd_{0.1}O_{2-\delta}$ | 1.6 | 0.22 | 0.33 | 13.9 | 18.9 |
| Example 2 | $CeO_2:GdO_{1.5}=80:20$ | $Ce_{0.8}Gd_{0.2}O_{2-\delta}$ | 2.0 | 0.21 | 0.53 | 17.7 | 20.1 |
| Example 3 | $CeO_2:SmO_{1.5}=90:10$ | $Ce_{0.9}Sm_{0.1}O_{2-\delta}$ | 1.7 | 0.21 | 0.42 | 21.1 | 13.2 |
| Example 4 | $CeO_2:SmO_{1.5}=80:20$ | $Ce_{0.8}Sm_{0.2}O_{2-\delta}$ | 1.8 | 0.20 | 0.37 | 22.3 | 11.3 |
| Comp. Ex. 1 | $CeO_2:GdO_{1.5}=90:10$ | $Ce_{0.9}Gd_{0.1}O_{2-\delta}$ | 1.0 | 0.69 | 1.91 | 20.1 | 2.6 |
| Comp. Ex. 2 | $CeO_2:GdO_{1.5}=80:20$ | $Ce_{0.8}Gd_{0.2}O_{2-\delta}$ | 1.0 | 1.25 | 1.39 | 26.5 | 3.1 |
| Comp. Ex. 3 | $CeO_2:SmO_{1.5}=90:10$ | $Ce_{0.9}Sm_{0.1}O_{2-\delta}$ | 1.0 | 0.63 | 1.26 | 25.2 | 2.3 |
| Comp. Ex. 4 | $CeO_2:SmO_{1.5}=80:20$ | $Ce_{0.8}Sm_{0.2}O_{2-\delta}$ | 1.0 | 0.62 | 2.19 | 26.8 | 2.1 |

Example 5

1 g of the powders prepared in Example 1 was uniaxially pressed in a rectangular parallelepiped mold (manufactured by POWER APPLIED JAPAN CO., LTD., having a pressure surface of 14 mm×7 mm) under a pressure of 100 MPa to obtain a green compact. This green compact was heated at a heating rate of 5° C./min up to 1150° C., and sintered at 1150° C. for 1 hour. After the interior temperature of the electric furnace was allowed to cool close to the room temperature, the sintered product was taken out, and the size and weight of the rectangular parallelepiped sample were measured to determine the density. The size was measured with a micrometer. The results are shown in Table 2. Further, a SEM (manufactured by JEOL LTD., JSM-T200) image of the obtained sintered product was taken at a magnification of ×10000. The result is shown in FIG. 1.

Figure 1:
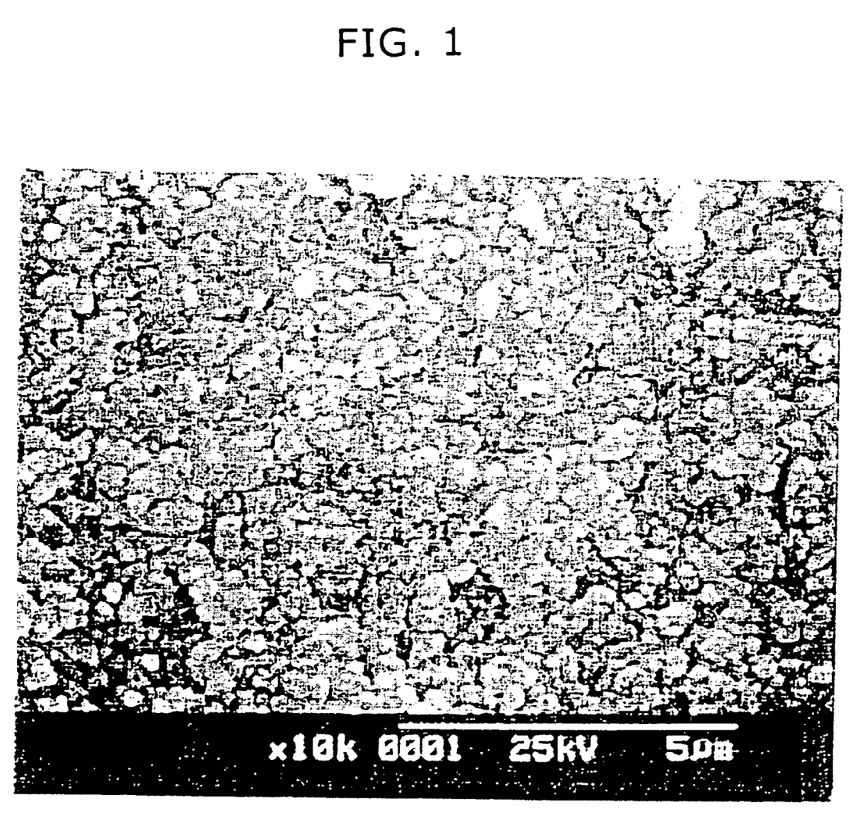
FIG. 1 is a copy of a SEM image of a sintered product prepared in Example 5 at a magnification of ×10000.

From FIG. 1, it is understood that the grain size of the primary grains in the sintered product obtained by the sintering at 1150° C. was 0.1 to 0.25 µm.

Examples 6 to 10

The sintering and measurements were performed in the same way as in Example 5, except that the heating up to 1150° C. and the sintering at 1150° C. were carried out at the temperature show in Table 2. The results are shown in Table 2.

Examples 11 to 16

A rectangular parallelepiped sample was prepared by sintering, and measurements thereof were made in the same way as in Example 5, except that 1 g of the powders prepared in Example 1 was replaced with 1 g of the powders prepared in Example 2. The results are shown in Table 2.

Examples 17 to 22

A rectangular parallelepiped sample was prepared by sintering, and measurements thereof were made in the same way as in Example 5, except that 1 g of the powders prepared in Example 1 was replaced with 1 g of the powders prepared in Example 3. The results are shown in Table 2.

Examples 23 to 28

A rectangular parallelepiped sample was prepared by sintering, and measurements thereof were made in the same way as in Example 5, except that 1 g of the powders prepared in Example 1 was replaced with 1 g of the powders prepared in Example 4. The results are shown in Table 2.

Comparative Examples 5 to 10

A rectangular parallelepiped sample was prepared by sintering, and measurements thereof were made in the same way as in Example 5, except that 1 g of the powders prepared in Example 1 was replaced with 1 g of the powders prepared in Comparative Example 1. The results are shown in Table 2.

Further, a SEM (manufactured by JEOL LTD., JSM-T200) image of the sintered product obtained in Comparative Example 10 was taken at a magnification of ×10000. The result is shown in FIG. 2.

Figure 2:
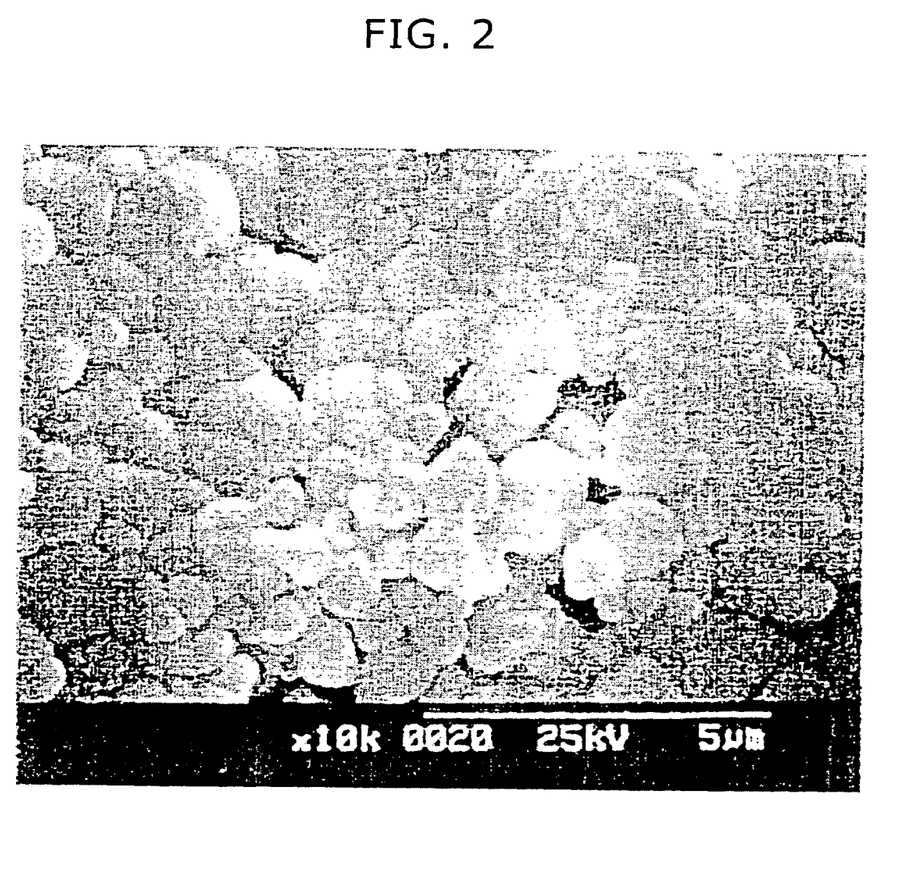
FIG. 2 is a copy of a SEM image of a sintered product prepared in Comparative Example 10 at a magnification of ×10000.

From FIG. 2, it is understood that the grain size of the primary grains in the sintered product obtained by the sintering at 1400° C. was 0.9 to 1.2 µm.

Comparative Examples 11 to 16

A rectangular parallelepiped sample was prepared by sintering, and measurements thereof were made in the same way as in Example 5, except that 1 g of the powders prepared in Example 1 was replaced with 1 g of the powders prepared in Comparative Example 2. The results are shown in Table 2.

Comparative Examples 17 to 22

A rectangular parallelepiped sample was prepared by sintering, and measurements thereof were made in the same way as in Example 5, except that 1 g of the powders prepared in Example 1 was replaced with 1 g of the powders prepared in Comparative Example 3. The results are shown in Table 2.

Comparative Examples 23 to 28

A rectangular parallelepiped sample was prepared by sintering, and measurements thereof were made in the same way as in Example 5, except that 1 g of the powders prepared in Example 1 was replaced with 1 g of the powders prepared in Comparative Example 4. The results are shown in Table 2.

TABLE 2

| | Composition | Temperature of heating and sintering (° C.) | Actual density (g/cm³) | Calculated density (g/cm³) | Relative sintering density (%) |
|---|---|---|---|---|---|
| Example 5 | $Ce_{0.9}Gd_{0.1}O_{2-\delta}$ | 1150 | 7.150 | 7.206 | 99.2 |
| Example 6 | | 1200 | 7.150 | | 99.2 |
| Example 7 | | 1250 | 7.150 | | 99.2 |
| Example 8 | | 1300 | 7.199 | | 99.9 |
| Example 9 | | 1350 | 7.199 | | 99.9 |
| Example 10 | | 1400 | 7.177 | | 99.6 |
| Example 11 | $Ce_{0.8}Gd_{0.2}O_{2-\delta}$ | 1150 | 7.199 | 7.258 | 99.2 |
| Example 12 | | 1200 | 7.211 | | 99.4 |
| Example 13 | | 1250 | 7.222 | | 99.5 |
| Example 14 | | 1300 | 7.222 | | 99.5 |
| Example 15 | | 1350 | 7.222 | | 99.5 |
| Example 16 | | 1400 | 7.219 | | 99.5 |
| Example 17 | $Ce_{0.9}Sm_{0.1}O_{2-\delta}$ | 1150 | 7.090 | 7.158 | 99.1 |
| Example 18 | | 1200 | 7.098 | | 99.2 |
| Example 19 | | 1250 | 7.100 | | 99.2 |
| Example 20 | | 1300 | 7.101 | | 99.2 |
| Example 21 | | 1350 | 7.108 | | 99.3 |
| Example 22 | | 1400 | 7.101 | | 99.2 |
| Example 23 | $Ce_{0.8}Sm_{0.2}O_{2-\delta}$ | 1150 | 7.050 | 7.117 | 99.1 |
| Example 24 | | 1200 | 7.080 | | 99.5 |
| Example 25 | | 1250 | 7.098 | | 99.7 |
| Example 26 | | 1300 | 7.046 | | 99.0 |
| Example 27 | | 1350 | 7.046 | | 99.0 |
| Example 28 | | 1400 | 7.053 | | 99.1 |
| Comp. Ex. 5 | $Ce_{0.9}Gd_{0.1}O_{2-\delta}$ | 1150 | 5.239 | 7.206 | 72.7 |
| Comp. Ex. 6 | | 1200 | 5.709 | | 79.2 |
| Comp. Ex. 7 | | 1250 | 5.816 | | 80.7 |
| Comp. Ex. 8 | | 1300 | 6.187 | | 85.9 |
| Comp. Ex. 9 | | 1350 | 6.883 | | 95.5 |
| Comp. Ex. 10 | | 1400 | 6.836 | | 94.9 |
| Comp. Ex. 11 | $Ce_{0.8}Gd_{0.2}O_{2-\delta}$ | 1150 | 5.75 | 7.258 | 79.2 |
| Comp. Ex. 12 | | 1200 | 6.474 | | 89.2 |

TABLE 2-continued

| Composition | Temperature of heating and sintering (° C.) | Actual density (g/cm³) | Calculated density (g/cm³) | Relative sintering density (%) |
|---|---|---|---|---|---|
| Comp. Ex. 13 | | 1250 | 6.895 | | 95.0 |
| Comp. Ex. 14 | | 1300 | 6.953 | | 95.8 |
| Comp. Ex. 15 | | 1350 | 7.040 | | 97.0 |
| Comp. Ex. 16 | | 1400 | 7.040 | | 97.0 |
| Comp. Ex. 17 | $Ce_{0.9}Sm_{0.1}O_{2-\delta}$ | 1150 | 4.52 | 7.158 | 63.1 |
| Comp. Ex. 18 | | 1200 | 6.406 | | 89.5 |
| Comp. Ex. 19 | | 1250 | 6.807 | | 95.1 |
| Comp. Ex. 20 | | 1300 | 6.872 | | 96.0 |
| Comp. Ex. 21 | | 1350 | 6.958 | | 97.2 |
| Comp. Ex. 22 | | 1400 | 6.993 | | 97.7 |
| Comp. Ex. 23 | $Ce_{0.8}Sm_{0.2}O_{2-\delta}$ | 1150 | 4.78 | 7.117 | 67.1 |
| Comp. Ex. 24 | | 1200 | 6.412 | | 90.1 |
| Comp. Ex. 25 | | 1250 | 6.903 | | 97.0 |
| Comp. Ex. 26 | | 1300 | 6.918 | | 97.2 |
| Comp. Ex. 27 | | 1350 | 6.918 | | 97.2 |
| Comp. Ex. 28 | | 1400 | 6.911 | | 97.1 |

Example 29

Figure 3:
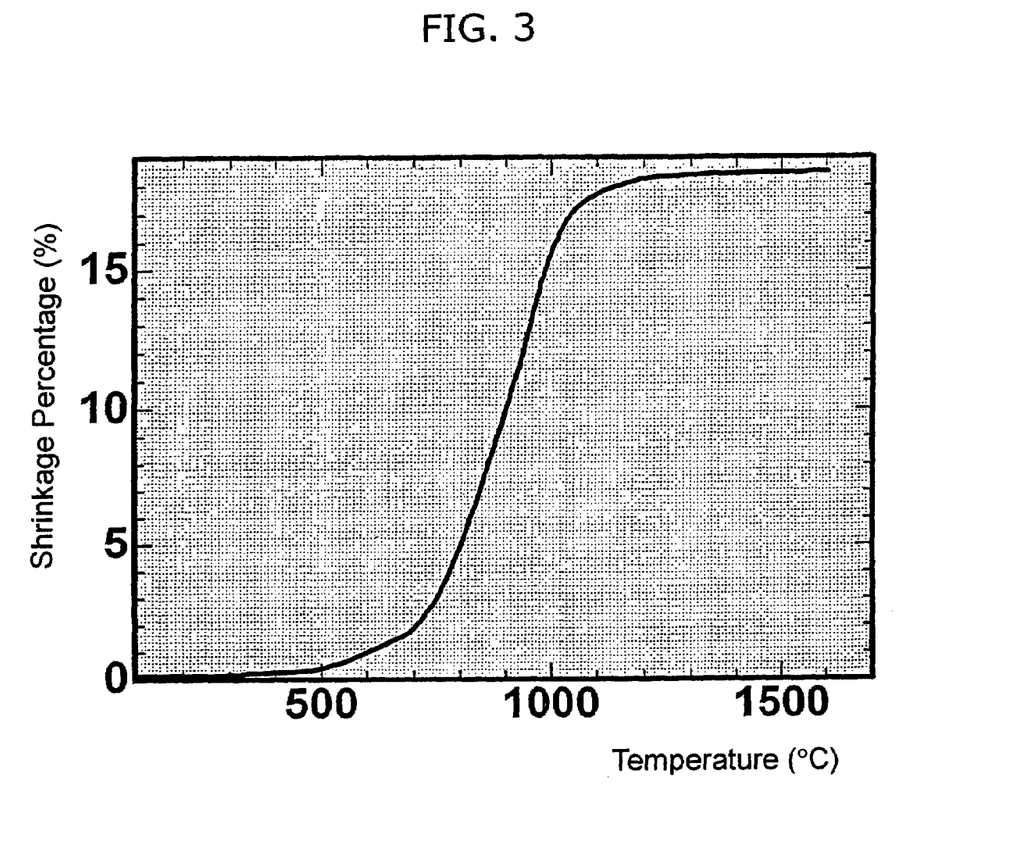
FIG. 3 is a graph showing the results of measurement of the relationship between the temperature and the shrinkage percentage of the green compact taken in Example 29.

1 g of the powders prepared in Example 1 was uniaxially pressed in a rectangular parallelepiped mold (manufactured by POWER APPLIED JAPAN CO., LTD., having a pressure surface of 14 mm×7 mm) under a pressure of 100 MPa to obtain a green compact. This green compact was heated at a heating rate of 5° C./min up to 1600° C., and the shrinkage percentage of the green compact was measured with TMA-8310 manufactured by RIGAKU CORPORATION. The results are shown in FIG. 3. From FIG. 3, it is understood that the shrinkage of this green compact completed at 1300° C.

Comparative Example 29

Figure 4:
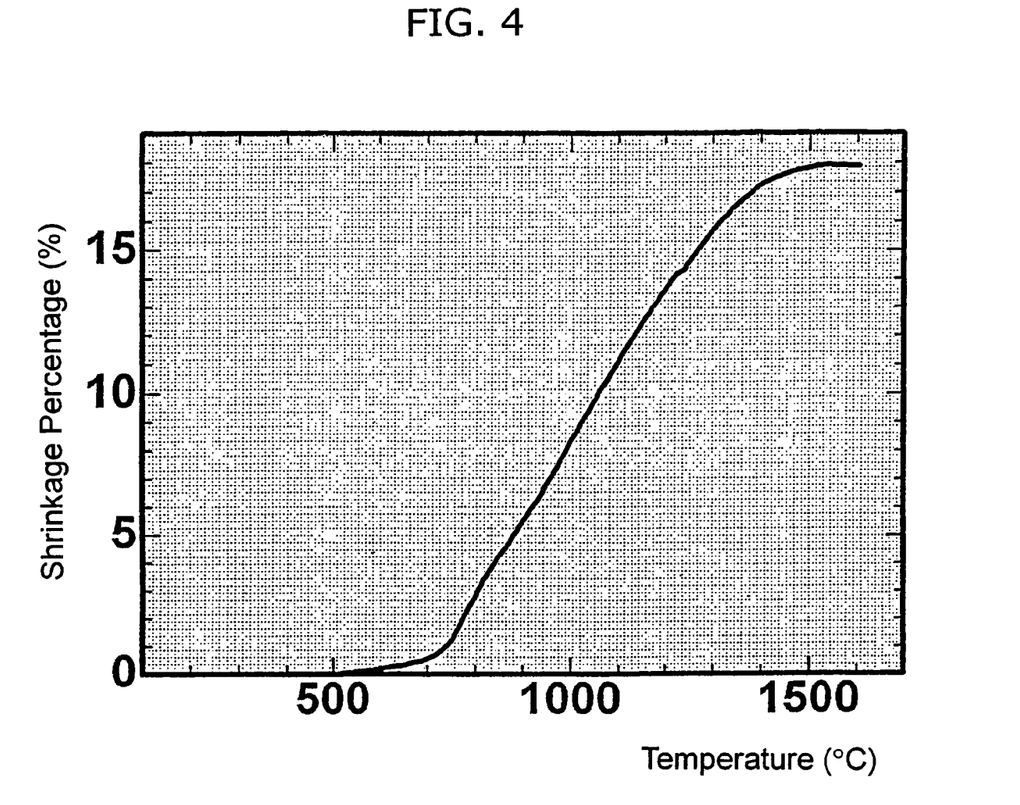
FIG. 4 is a graph showing the results of measurement of the relationship between the temperature and the shrinkage percentage of the green compact taken in Comparative Example 29.

1 g of the powders prepared in Comparative Example 1 was uniaxially pressed in a rectangular parallelepiped mold (manufactured by POWER APPLIED JAPAN CO., LTD., having a pressure surface of 14 mm×7 mm) under a pressure of 100 MPa to obtain a green compact. This green compact was heated at a heating rate of 5° C./min up to 1600° C., and the shrinkage percentage of the green compact was measured with TMA-8310 manufactured by RIGAKU CORPORATION. The results are shown in FIG. 4. From FIG. 4, it is understood that the shrinkage of this green compact did not complete at 1300° C., but completed at about 1500° C.

What is claimed is:

1. A cerium based composite oxide comprising: 0.1 to 50 mol % of at least one metal selected from the group consisting of yttrium, scandium, and rare earth elements excluding cerium and promethium, in term of oxides, and
  50 to 99.9 mol % of cerium in terms of oxides,
  wherein said composite oxide is in a form of acicular primary particles having an average aspect ratio (length/width) of 1.05 to 10.0.

2. A cerium based composite oxide in a form of secondary particles consisting of aggregates of primary particles of claim 1, and having an average aspect ratio of 5.0 to 40.0.

3. A cerium based composite oxide of claim 2 wherein the secondary particles have a BET specific surface area of 5 to 40 m²/g, an average particle size of 0.1 to 0.5 μm, and a particle size distribution expressed by a particle size distribution index represented by the formula (1) of not higher than 1.6:

$$\text{Particle Size Distribution Index} = (D84-D16)/(2 \times D50) \quad (1)$$

wherein D16, D50, and D84 each stands for an accumulated particle size of top 16%, 50%, and 84% particles from the finest.

4. A method for preparing cerium based composite oxide of claim 3 comprising the steps of:
  (A) adding alkali to a cerium salt-containing mixed solution containing 0.1 to 50 mol % salt of at least one metal selected from the group consisting of yttrium, scandium, and rare earth elements excluding cerium and promethium and 50 to 99.9 mol % cerium salt to obtain a precipitate slurry of cerium based composite salt,
  (B) introducing 0.1 to 1.0 mol carbonate ions per 1 mol of rare earth elements in the precipitate slurry, and heat-treating said precipitate slurry under atmospheric pressure at 40 to 100° C. to prepare precipitate of carbonate ion-containing cerium based composite salt,
  (C) calcining said precipitate at 600 to 1000° C. to obtain calcined powders, and
  (D) grinding said calcined powders.

5. The method of claim 4, wherein a total concentration of said cerium salt and said salt of at least one metal selected from the group consisting of yttrium, scandium, and rare earth elements excluding cerium and promethium in said cerium salt-containing mixed solution in step (A) is 0.1 to 1.0 mol/L, and
  wherein said alkali in step (A) is in a form of an aqueous solution at a concentration of 0.3 to 2.0 mol/L.

6. A green compact molded by pressing a composite oxide of claim 3.

7. The green compact of claim 6, wherein said compact completes shrinkage by heating at a heating rate of 5° C./min up to 1300° C.

8. A method of producing a sintered product the green compact of claim 6 having a relative sintering density of not lower than 99%, and an average grain size of primary grains in the sintered product of 0.8 to 3.0 μm, said method comprising the steps of:
  (A) adding alkali to a cerium salt-containing mixed solution containing 0.1 to 50 mol % salt of at least one metal selected from the group consisting of yttrium, scandium, and rare earth elements excluding cerium and promethium and 50 to 99.9 mol % cerium salt to obtain a precipitate slurry of cerium based composite salt,
  (B) introducing 0.1 to 1.0 mol carbonate ions per 1 mol of rare earth elements in the precipitate slurry, and heat-treating said precipitate slurry under atmospheric pressure at 40 to 100° C. to prepare precipitate of carbonate ion-containing cerium based composite salt,
  (C) calcining said precipitate at 600 to 1000° C. to obtain calcined powders,
  (D) grinding said calcined powders to obtain composite oxide
  (E) molding said composite oxide by pressing to prepare the green compact of claim 6 and
  (F) sintering said green compact at 1150 to 1400° C.

* * * * *

UNITED STATES PATENT AND TRADEMARK OFFICE
CERTIFICATE OF CORRECTION

| | | |
|---|---|---|
| PATENT NO. | : 7,119,041 B2 | Page 1 of 1 |
| APPLICATION NO. | : 10/507032 | |
| DATED | : October 10, 2006 | |
| INVENTOR(S) | : Eisaku Suda et al. | |

It is certified that error appears in the above-identified patent and that said Letters Patent is hereby corrected as shown below:

On Title Page item 86
In the Filing Date:

Please delete "September 7, 2004" and substitute with -- October 13, 2004 --.

Signed and Sealed this

Nineteenth Day of December, 2006

JON W. DUDAS
*Director of the United States Patent and Trademark Office*